May 10, 1932.   A. DAVISON   1,857,500
WEED PULLER
Filed Aug. 1, 1930
FIG. 1.
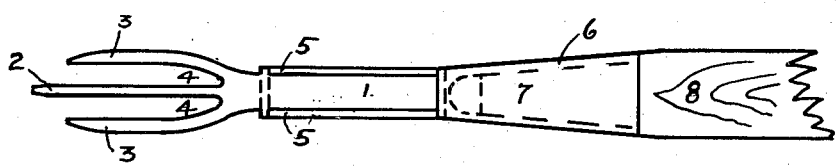
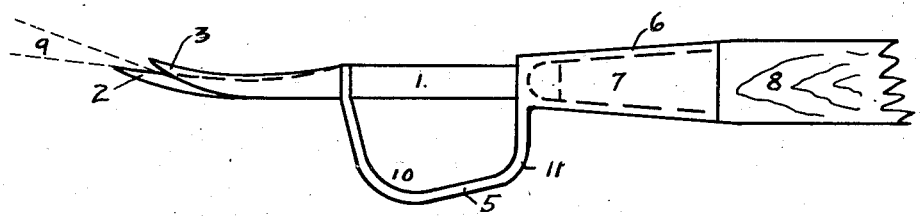
FIG. 2.
INVENTOR
Alexander Davison
BY Benjamin Webster
ATTORNEY Patented May 10, 1932

1,857,500

UNITED STATES PATENT OFFICE

ALEXANDER DAVISON, OF VALLEY STREAM, NEW YORK, ASSIGNOR OF THREE-TENTHS TO THE INVENTIONS EXPLOITATION CORPORATION, OF NEW YORK, N. Y., A CORPORATION OF DELAWARE

WEED PULLER

Application filed August 1, 1930. Serial No. 472,306.

This invention relates to weed pullers and more especially to hand tools of this type, and it has for its objects, among others; first, to provide such a tool that will easily penetrate the surface of a lawn with a comparatively light pressure; second, to provide such a tool that is easily guided to a central position beneath a weed; third, to provide such a tool that with one motion the main and the auxiliary roots may be completely extracted from the soil; fourth, to provide such a tool in which all the tines are as near the longitudinal axis as possible; fifth, to provide such a tool in which there is a wedging grip on the body of the roots; sixth, to provide such a tool in which there is a stop to limit penetration of the soil; seventh, to provide such a tool in which there is a fulcrum; eighth, to provide such a tool in which there is a portion adapted for pressure by the foot or particularly the sole of the shoe; and ninth, to provide such a tool with a socket portion adapted to interchangeably receive a handle. Other objects may appear as the description proceeds.

Reference is now made to the drawings which are hereby made a part of this specification, in which Figure 1 is a plan view of my improved weed puller with a part of the wooden handle broken away, and Figure 2 is a side elevation.

The cylindrical steel shaft 1 supports the central finger or tine 2 and two auxiliary tines or fingers 3, 3 symmetrically positioned with reference to the tine 2. The tine 2 is relatively narrow in the vertical plane and is extended to a point beyond the adjacent tines 3, 3. The upper longitudinal edge of the tine 1 is a slow curve with the point terminating in a line slightly above the axis of the cylindrical portion 1. The adjacent tines 3, 3 are more square shaped tapering into points but having their sides adjacent the tine 2 substantially parallel therewith so that all the tines penetrate the soil in substantially the same axial direction. The points are elevated more than the point of tine 2 so that the lower curved edges of the tines 3, 3 rise above the upper edge of tine 2 so that a wedge shaped portion 9 is formed in the horizontal plane.

A broad flat looped band 5 is secured, one end not far from the openings 4, 4 between the tines and the other end adjacent the support 6. This band 5 is curved as shown at 10 in Fig. 2 to provide a rocker fulcrum and again as shown at 11 to provide a pedal against which the sole of the shoe may be pressed either to relieve the muscles of the arm or in case of an increased resistance to penetration of the soil. The fulcrum at 10 also provides a stop to prevent undue and unnecessary penetration of the root.

The upper portion 6 is in the form of a truncated cone with a symmetrical socket portion 7 adapted to receive a similarly shaped end of a wooden handle 8. This construction permits of a facile attachment or replacement of the handle 8.

The operation of my improved weed puller is now set forth. The operator points the central tine 2 directly beneath the stalk or stem of the weed to be extracted pushing it sharply into the main root and assisting with a toe thrust at 11 until fulcrum 10 lies upon the surface. Side tines 3, 3 each penetrates the thick growth of roots radiating beneath the surface and the lower edge of each tine 3, 3 presses them down across the upper surface of the tine 2 to make a wedge-shaped tangle which holds the roots securely at the points of the tines in conjunction with the upper curved surfaces of tines 3, 3. A slight pressure on the handle 8 easily lifts the most resistance weed through fulcrum 10. The curve at 10 and the breadth of the band 5 combine to prevent any appreciable mutilation of the lawn and after the removal of the weed which readily slips off by drawing the tines across the edge of a basket a pressure by the foot on the place of extraction quickly perfects the surface of the lawn.

It will be noted that my weed puller, instead of cutting and mutilating an obnoxious weed root and leaving a portion to again sprout into a new plant, completely eradicates the main and the auxiliary roots. My weed puller is also so constructed that it will last a lifetime and although sharp and delicate in action it has a maximum of robustness making it capable of quick and facile extraction of the most resistant weed with a minimum of mutilation of the surface of a lawn. The central tine 2 has greater vertical than horizontal thickness and although its length is greater it has therefore a robustness and longevity equal to that of the more square-shaped tines 3, 3. All the parts aside from the handle 8 are preferably welded in one solid whole so that there are no weak joints or parts to become loosened. In view of my improvements over the previous articles for this purpose I confidently assert that now for the first time a truly scientific weed puller is embodied in my invention, combining the minimum of labor to secure a maximum result, simplicity of construction, low manufacturing cost, compactness, robustness, lightness and longevity.

Having now illustrated and described a preferred embodiment of my invention I do not choose to limit myself except as in the appended claims.

I claim:

1. A weed puller, comprising a handle, and a fork attached to said handle and having a plurality of tines, one of said tines being longer than the adjacent tine and curved upwardly, the adjacent tine being also curved upwardly but more sharply toward its point so that a transverse plane across the top of the central tine and a transverse plane across the bottom of the adjacent tine form a relatively sharp acute angle.

2. A weed puller, comprising a handle, and a fork attached to said handle and comprising three fingers or tines, the central finger being pointed and aligned with the said handle and also extending beyond the other fingers and being relatively thinner in the transverse plane than in the vertical plane and the adjacent fingers being wider in the transverse plane and curved upwardly toward the points more than the central finger.

3. A weed puller, comprising a fork having three steel tines, one being centrally positioned and pointed and narrower in the transverse plane than in the vertical plane and curved upwardly toward the point, the other adjacent tines being relatively broader than the central tine and also pointed but curved upwardly toward their points more than the central tine.

4. A weed puller, comprising a fork having three steel tines, one being centrally positioned and pointed and narrower in the transverse plane than the vertical plane and curved upwardly toward the point, the other tines being relatively broader than the central tine and also pointed but curved upwardly toward their points more than the central tine, and a broad flat band secured at the top of said fork and curved to form a fulcrum.

Signed in the county of Nassau, and State of New York, this thirty-first day of July, A. D. 1930.

ALEXANDER DAVISON.